J. S. SWAN.
HOLD BACK FOR VEHICLES.
No. 36,425. Patented Sept. 9, 1862.
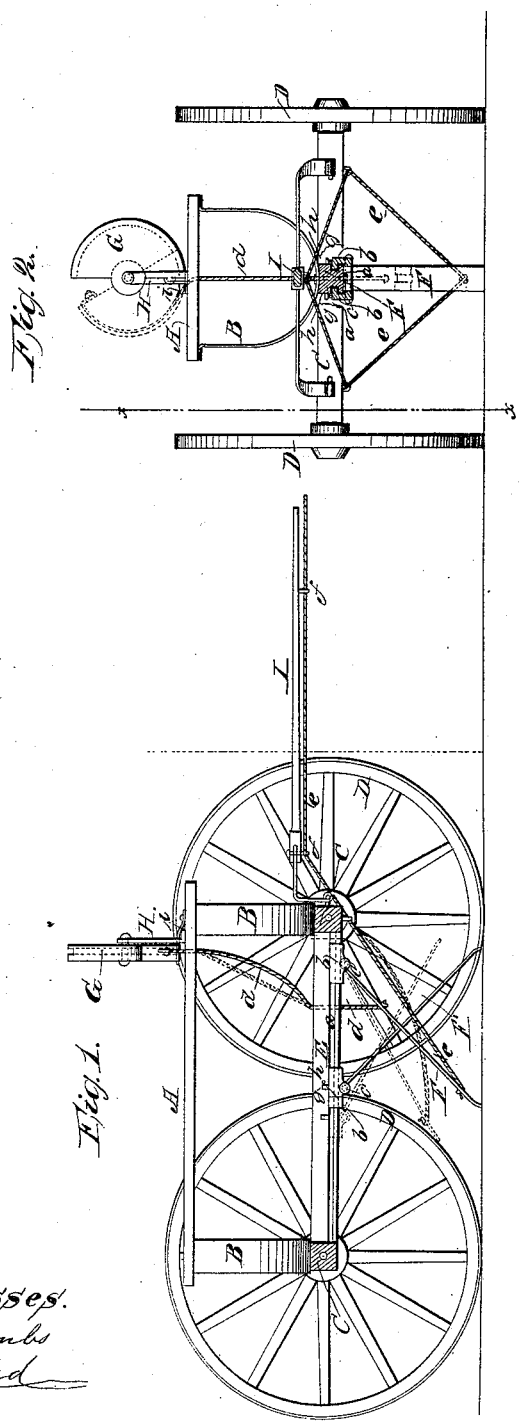

UNITED STATES PATENT OFFICE.

JAMES S. SWAN, OF MONGAUP VALLEY, NEW YORK.

HOLDBACK FOR WHEELED VEHICLES.

Specification of Letters Patent No. 36,425, dated September 9, 1862.

*To all whom it may concern:*

Be it known that I, JAMES S. SWAN, of Mongaup Valley, in the county of Sullivan and State of New York, have invented a new and Improved Holdback for Wheeled Vehicles; and I do hereby declare that the following is a full, clear, and exact description of the same, reference being had to the accompanying drawing, forming a part of this specification, in which—

Figure 1; represents a longitudinal vertical section of my invention the line $x, x$, Fig. 2 indicating the plane of section. Fig. 2; is a transverse vertical section of the same taken in the plane indicated by the line $y, y$, Fig. 1.

Similar letters in both views denote corresponding parts.

This invention consists in the arrangement of two hinged levers connected to the truck frame or perch of a carriage or other wheel vehicle by means of pivots or in any other desirable manner in combination with two lines or chains one connecting to a hinged segment for the purpose of raising the levers from the ground and one connecting with the straps of the horses or draft animals in such a manner that in going up hill, if the vehicle begins a retrograde motion and the hinged levers are lowered, the strain of the horses forces them to bear hard on or to penetrate the ground and to hold the vehicle firm in its place, and at the same time the progress of the vehicle can be stopped whenever it is desired.

To enable those skilled in the art to make and use my invention I will proceed to describe its construction and operation with reference to the drawing.

The platform A, or the body of the vehicle is supported by springs B, which rest upon the axles C, of the wheels D. The axles are connected by the perch F, in the usual manner, and said perch is furnished with two grooves $a$, one on either side, which form guides for slides $b, b'$, to which the levers F, F', are connected by means of pivots $c, c'$ or in any other convenient manner. These levers swing freely up and down so that they can be raised and brought in the position shown in red outlines in Fig. 1 or that they can be lowered to the ground as shown in black outlines in both figures, and they are connected together by means of guide grooves and slot or in any other convenient manner so that by raising one of the levers the other is also raised and vice versa.

A cord or chain $d$, extends from the lever F, to a grooved segment G, which is pivoted to a standard H, on the top of platform A, and said cord is connected to one edge of the segment so that by bringing the same in the position shown in black outlines in Fig. 2, the lever F, is lowered and by bringing the same in the position shown in red outlines in the same figure the cord winds on the segment and the lever F, is raised. And by raising and lowering the lever F, the lever F', is caused to rise and fall simultaneously as previously described. When the levers F, F', are raised the segment G is retained in its position by a spring catch $i$.

A second cord $e$, extends from the lower end of lever F, to the draft pole I, and under the same through staples $f$, to the straps of the horses or draft animals. By pulling the cord the levers F, F', are turned down to the position shown in black outlines in Fig. 1 and when a forcible strain is exerted on said cord the end of lever F, is caused to penetrate the ground and to prevent a retrograde motion of the vehicle. At the same time the lever F', prevents a forward motion of the vehicle, so that in going down hill the same can be prevented crowding on the horses or that the progress of the vehicle can be stopped at pleasure when the horses should try to run away. In order to prevent the lever F', to act too suddenly upon the ground, whereby the vehicle would be liable to be upset, the slide $b'$, is provided with a projecting pin $q$, which by coming in contact with stops $h$, on the sides of the perch prevent a forward motion of said slide beyond a certain point.

This device can be conveniently attached to any vehicle old or new and it gives to the driver perfect control over the motions of the same in either direction and if he wishes to leave the horses he can do so without the least danger by letting down the levers which serves the same purpose as tying the horses to a post.

What I claim as new and desire to secure by Letters Patent is—

The arrangement of the levers F, F', and slides $b, b'$, in combination with the cords or chains $d, e$, all applied to a wheeled vehicle and operating in the manner shown and described.

JAMES S. SWAN.

Witnesses:
HIRAM POST,
WYNKOOP KIERSTED.